(12) United States Patent
Montarou et al.

(10) Patent No.: US 8,081,387 B2
(45) Date of Patent: Dec. 20, 2011

(54) DISPLAY DEVICE

(75) Inventors: Laurent Montarou, Paris (FR); Olivier Luneau, Auvers sur Oise (FR); Robert Arnould, Sardon (FR)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 12/598,721

(22) PCT Filed: May 5, 2008

(86) PCT No.: PCT/EP2008/003588
§ 371 (c)(1),
(2), (4) Date: Feb. 17, 2010

(87) PCT Pub. No.: WO2008/135261
PCT Pub. Date: Nov. 13, 2008

(65) Prior Publication Data
US 2010/0157431 A1 Jun. 24, 2010

(30) Foreign Application Priority Data
May 4, 2007 (DE) .......................... 10 2007 021 516

(51) Int. Cl.
*G02B 27/14* (2006.01)
(52) U.S. Cl. ....................................... 359/632; 359/630

(58) Field of Classification Search .................. 359/630, 359/632; 345/7–9
See application file for complete search history.

(56) References Cited

U.S. PATENT DOCUMENTS

| 3,802,764 A | 4/1974 | Ellis |
| 2009/0086329 A1* | 4/2009 | Potakowskyj et al. ........ 359/630 |

FOREIGN PATENT DOCUMENTS

| DE | 102005023578 B3 | 10/2006 |
| DE | 102006042693 A1 | 3/2008 |
| WO | WO 2008/063632 A | 5/2008 |

OTHER PUBLICATIONS

International Search Report corresponding to PCT/EP2008/003588, dated Apr. 9, 2008, 4 pages.
PCT Written Opinion corresponding to PCT/EP2008/003588, 7 pages.

\* cited by examiner

*Primary Examiner* — Alicia M Harrington
(74) *Attorney, Agent, or Firm* — Foley & Lardner LLP (57) ABSTRACT

The invention relates to a display device, particularly for an automotive vehicle, that comprises an unfolding member (1), the display device including a mounting member (10) for attaching the unfolding member in at least a first inactive position and in at least a second unfolded position, the display device being adapted so that the unfolding member follows an unfolding movement between the first and second positions thereof, the movement of the unfolding member including at least partially a translation portion and a rotation portion.

15 Claims, 8 Drawing Sheets

Fig. 18

DISPLAY DEVICE

CROSS-REFERENCE TO RELATED APPLICATIONS

The present application is a National Stage of PCT/EP2008/003588, filed May 5, 2008, which claims priority to DE 10 2007 021 516.0, filed May 4, 2007. The foregoing applications are incorporated by reference herein in their entirety.

The present invention relates to a display device, as for a motor vehicle, as of the head-up display type.

Display devices, such as head-up display devices, are known, for example from German patent application DE 197 22 944 A1. That publication teaches the production of a head-up type display device with an extending mirror.

One problem with a prior-art device of that kind is the transfer of disturbances, especially vibrations, to an extending mirror of that kind.

It is a particular object of the present invention to alleviate the problems of the prior art, and in particular those cited above, and also to propose a display device or fixing device that is not only stable and robust but also weighs little, takes up little space, and can be manufactured simply, efficiently and inexpensively.

According to the invention, this object is achieved with a display device or with a fixing device, as for a motor vehicle, comprising an extending element, the display device or fixing device comprising a mounting element to allow the extending element to be fixed in at least one first, inactive, position and at least one second, extended, position, the display device or fixing device being designed in such a way that the extending element follows a movement of the extending element between its first and second positions, the movement of the extending element comprising at least partially a translational part and a rotational part.

With such a construction of the display device or fixing device, it is advantageously possible to position the extending element—such as for example a mirror—from the first position (the inactive or "rest" position) to a second position (the extended or "working" position) and back again in a combined movement of translation and rotation.

In the context of the present invention, the fixing device is used in a vehicle component for retaining or attaching an element in such a way as to limit external disturbances such as mechanical or vibrational disturbances. The fixing device according to the invention is particularly used to make a display device, such as a head-up display (HUD).

However, the invention can also be applied to other vehicle components for retaining or attaching an extending element, such as sun visor elements, car exterior rear-view mirror elements, screen-type display elements for a reversing video camera, and other similar things. Such extending elements, especially an extending mirror, are designed to be supported with sufficient stability and repeatability in a plurality of positions, including at least one stop or inactive position (the rest position or first position) and at least one extended position (the working position or second position).

In a preferred improvement of the invention, the mounting element comprises an elastic element and a positioning element, the elastic element exerting a force between the extending element on one side and the positioning element on the other side. In such an embodiment, it is advantageously possible to ensure the stability of the extending element or else of the extending mirror in the extended position by a simple elastic element—a metal spring or an elastomer spring being examples. With such an elastic element, it is also possible to largely eliminate squeaks and rattles (as due to vehicle vibrations) when the extending element is positioned in its first and/or second position. It is preferred to have the elastic element create a tension in the extending element against a stop so that the positioning of the extending element, in its first and second positions, can be achieved with great accuracy and repeatability despite the fact that the display device or fixing device is used in a vehicular environment with external mechanical, thermal and/or chemical influences such as mechanical vibrations, mechanical actions by a user, temperature fluctuations, and aggressive chemical environments.

In yet another preferred embodiment, the positioning element follows an essentially translational movement between the first and second positions of the extending element, notably a translational movement along a threaded rod. In such an embodiment, the movement of the extending mirror or extending element can be accomplished by a movement of the positioning element that is not only very simple and highly reliable, but also comparatively fast.

In a preferred improvement of the invention, the positioning element has a first hinged joint to the extending element. In such an embodiment the combined movement of translation and rotation of the extending element during the motion of the positioning element can be brought about simply and robustly.

In yet another preferred embodiment, the mounting element comprises a first guide element, such as for example a ramp, and in that the mounting element comprises a second guide element, such as for example a roller. In another preferred improvement of the invention, the mounting element comprises a third guide element, in the form of for example a locking pin, and in that the mounting element comprises a fourth guide element, in the form of for example a hook. With such an embodiment it is possible to define the movement of the extending element on the basis of the movement of the positioning element in a simple and precise manner.

In yet another preferred embodiment, the second guide element has a second hinged joint to the extending element and/or the fourth guide element has a third hinged joint to the extending element. With such an embodiment a flexible movement of the extending element is made possible in a simple manner.

In another preferred improvement of the invention, the movement of the extending element has a smaller rotational part and a larger translational part near the first position of the extending element and the movement of the extending element has a larger rotational part and a smaller translational part near the second position of the extending element. With such an embodiment it is possible to reduce the space required to bring about the movement of the extending element.

Other features and advantages of the invention will become apparent on reading the following description of one particular non-restrictive embodiment of the invention.

BRIEF DESCRIPTION OF THE DRAWINGS

A clearer understanding of the invention will be gained from the following description, which refers to certain preferred embodiments presented by way of non-restrictive examples and explained with reference to the accompanying schematic drawings, in which.

DESCRIPTION OF THE DRAWINGS

FIGS. 1-18 show various views of a display device in two embodiments of the present invention. The display device in both embodiments is one example of a fixing device according to the present invention. The display device comprises an extending mirror 1. The extending mirror 1 is one example of an extending element 1. Other examples for the extending element 1 include a sun visor, an exterior rear-view mirror for a car or a screen-type display element for a reversing video camera.

The display device comprises a mounting element 10 to allow the extending element 1 to be fixed in at least one first position and at least one second position. The mounting element 10 comprises a positioning element 3 and an elastic element 4. The elastic element 4 exerts a force between the extending element 1 on one side and the positioning element 3 on the other side. The action of the elastic element 4 generates a tension on the extending element 1 so that the extending element comes into contact with a stop (not shown in the figures) in such a way that the extending element can be positioned in its first and second positions with great accuracy and repeatability despite the fact that the display or fixing device is being used in a vehicle environment.

The positioning element 3 is in particular produced in the form of a linear actuator, for example in the form of a positioning carriage. The elastic element 4 is produced for example in the form of a metal spring or of an elastomeric material, typically in the form of an elastomeric plastic or in the form of a combination of a metal spring with an elastomeric plastic.

Figure 1:
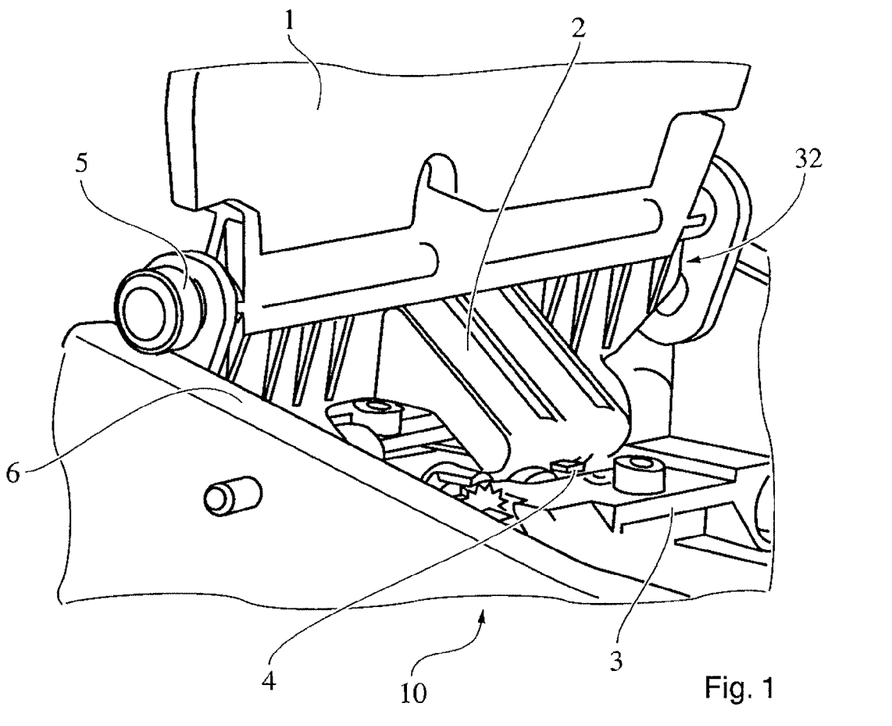
FIG. 1 is a detailed perspective view of a display device in a first embodiment of the present invention.
Figure 2:
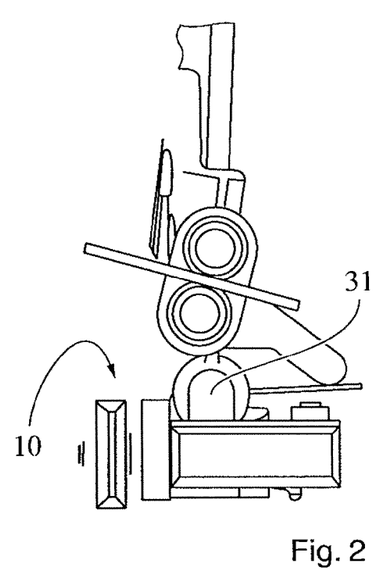
FIGS. 2-5 are side views of the display device in the first embodiment of the present invention.
Figure 3:
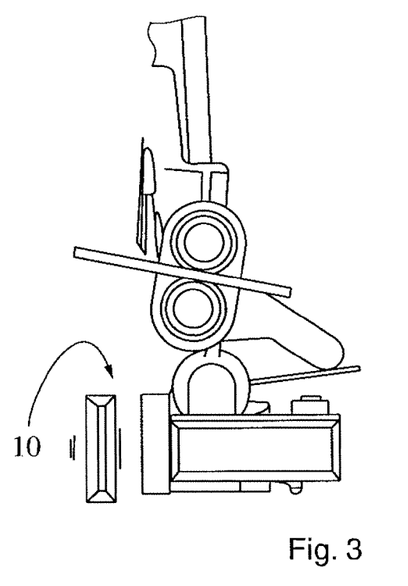
Figure 4:
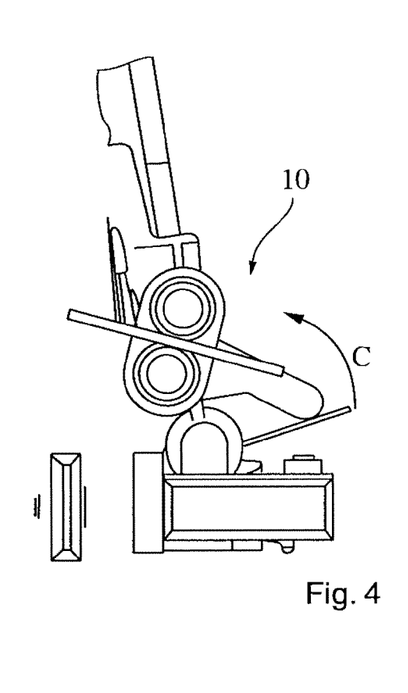

FIG. 1 is a detailed perspective view of the display device in the first embodiment of the present invention, and FIGS. 2 to 5 are side views. In its first embodiment, the extending mirror 1 or extending element 1 comprises a bearing element 2 which interacts with the positioning element 3 and with the elastic element 4. The mounting element 10 comprises a first guide element 6, in the form of for example a ramp. The mounting element 10 also comprises a second guide element 5, which may be in the form of a roller or two rollers (see FIGS. 2 to 5). The movement of the extending element 1 is defined by at least the first guide element 6 and the second guide element 5 in such a way that the movement of the extending element 1 includes at least partially a translational part and a rotational part. The first guide element 6 interacts with the second guide element 5 in such a way as to define an angle of inclination of the extending element 1 for each linear position of the positioning element 3. For this purpose a first hinged joint 31 (shown in FIG. 2 only) is provided between the positioning element 3 and the extending element 1 and a second hinged joint 32 (shown in FIG. 1 only) is provided between the second guide element 5 and the extending element 1.

The elastic element 4 exerts a torque (reference sign C in FIG. 4) on the extending element 1 against a stop (not shown). With this construction, any play in the positioning of the extending element 1 can be closed up. It follows that, for example, mechanical vibrations have less influence on the positioning of the extending element 1. Furthermore, the extending element 1 can thus be positioned in different positions adapted to the individual user, all these positions corresponding to extended positions of the extending element 1.

Figure 5:
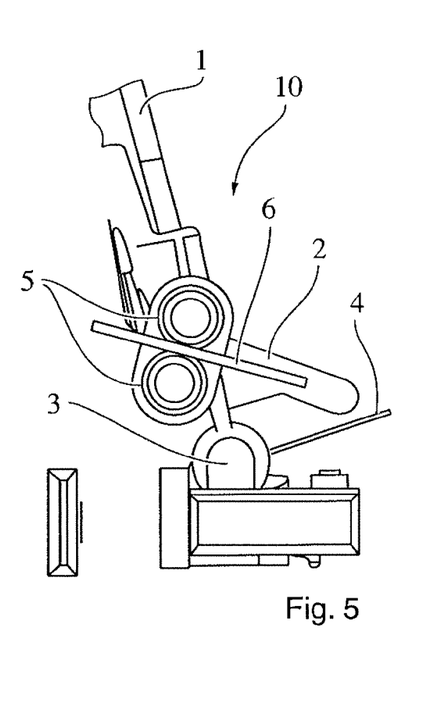

The elastic element 4 can be relaxed when the positioning element 3 is moved toward its position corresponding to the first (or rest) position of the extending element 1 (see FIG. 5).

Figure 14:
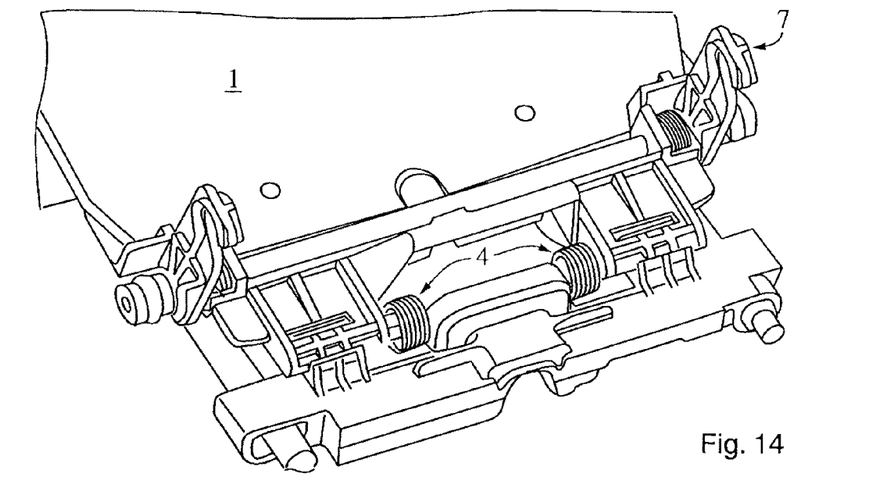
Figure 15:
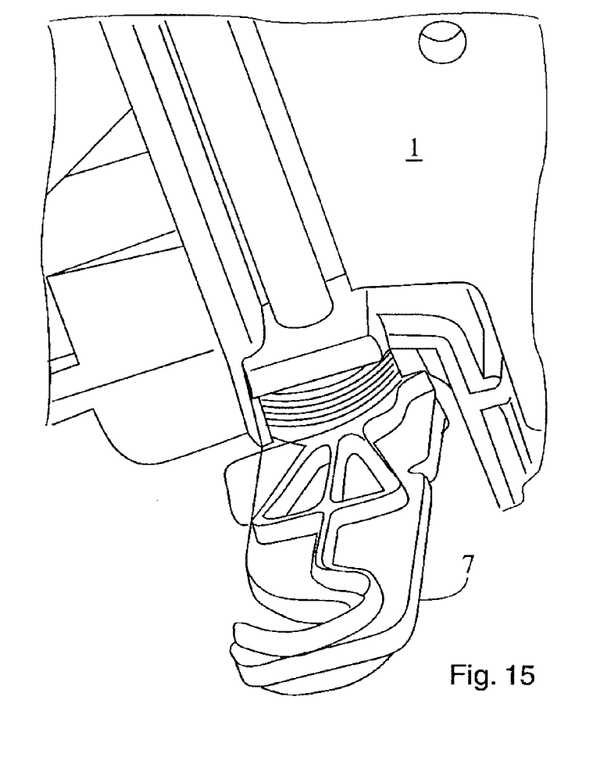
Figure 16:
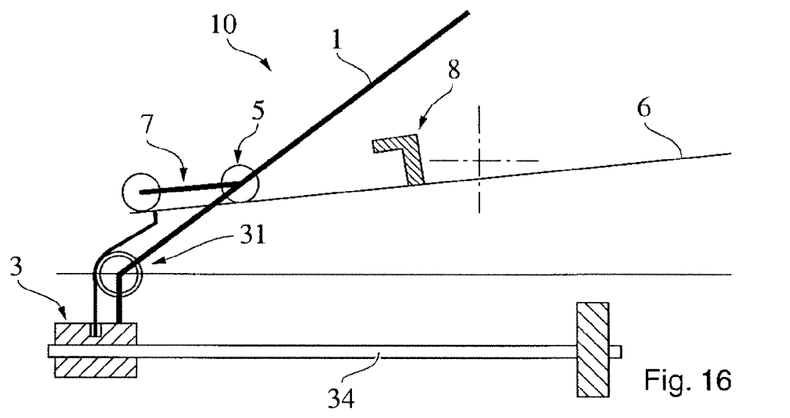
FIGS. 16-18 are side views of the display device in the second embodiment of the present invention.
Figure 17:
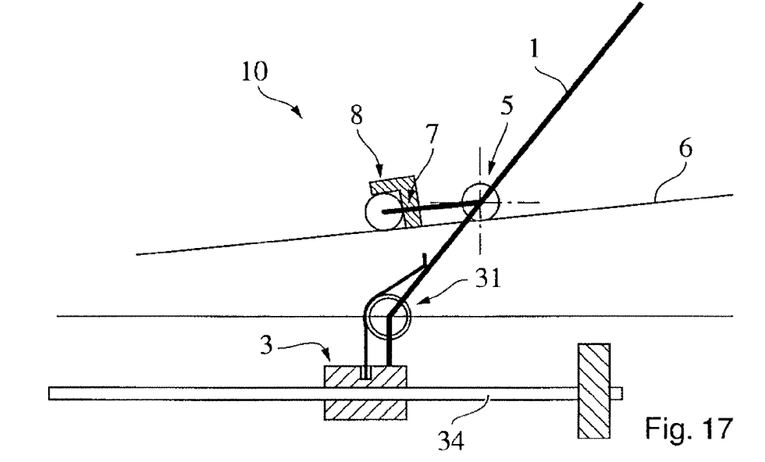
Figure 18:
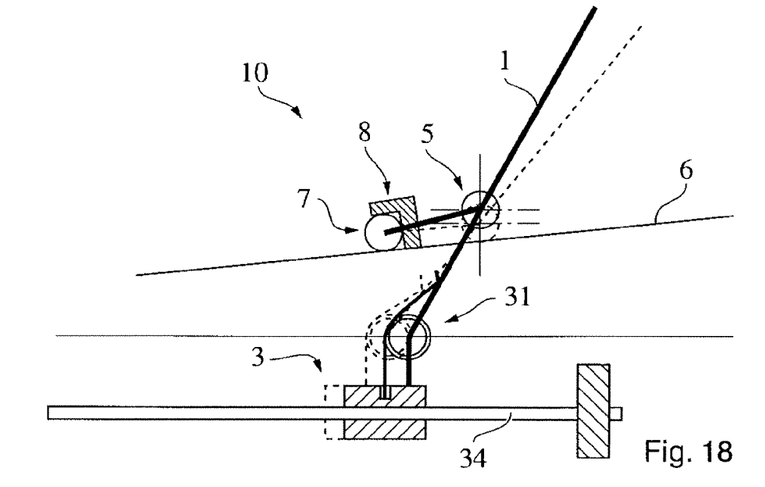

FIGS. 6 to 15 are perspective views of a display device according to a second embodiment of the present invention, and FIGS. 16 to 18 are side views.

Figure 6:
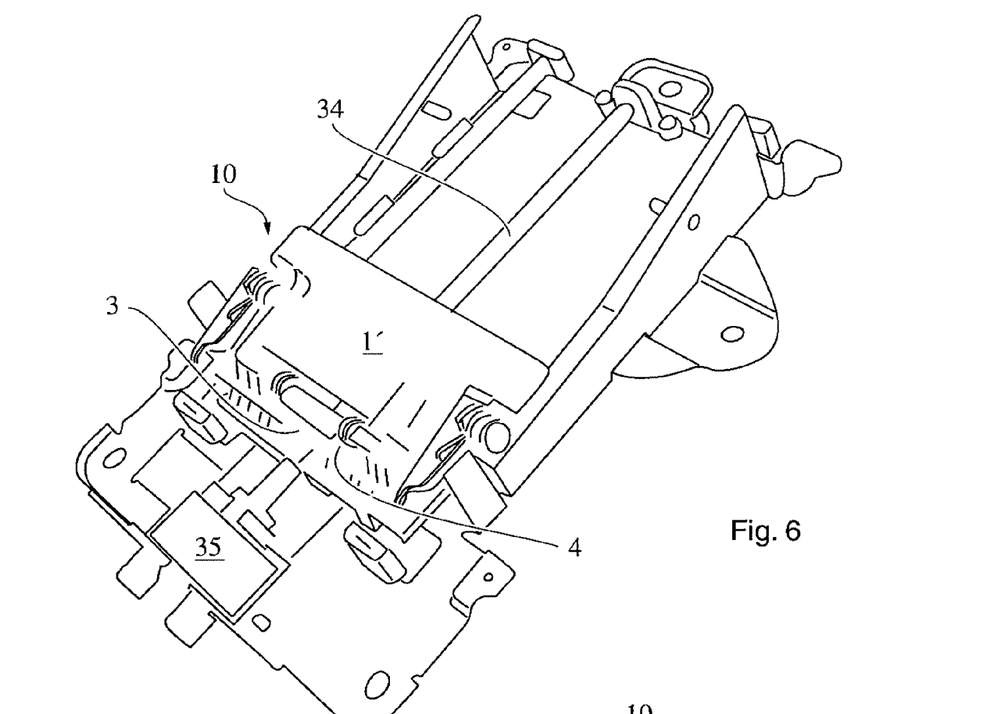
FIGS. 6-15 are perspective views of a display device in a second embodiment of the present invention.
Figure 7:
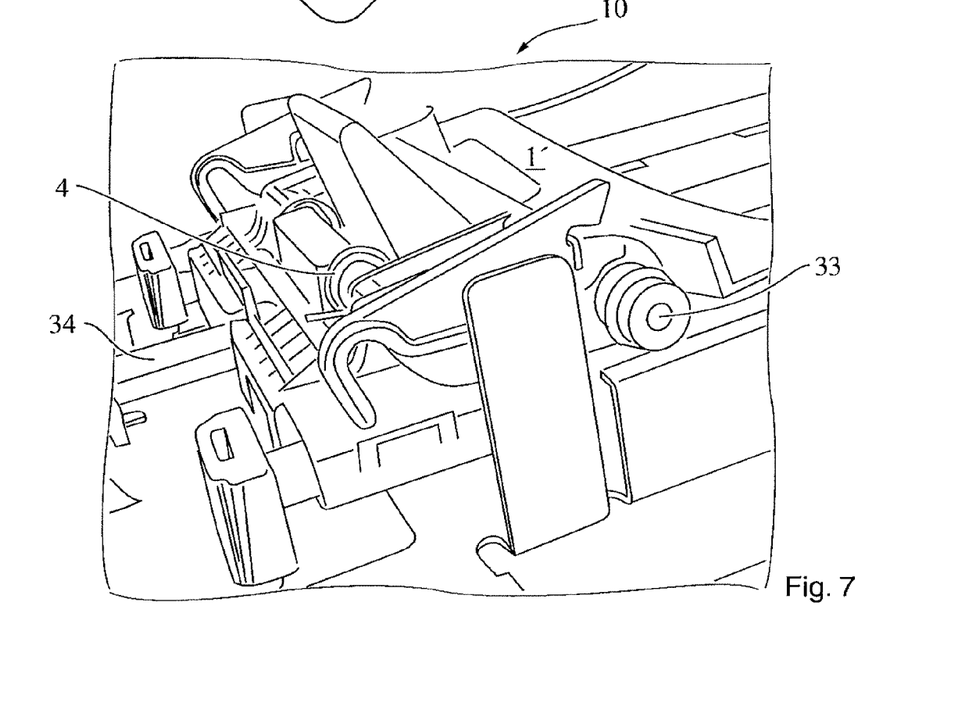
Figure 8:
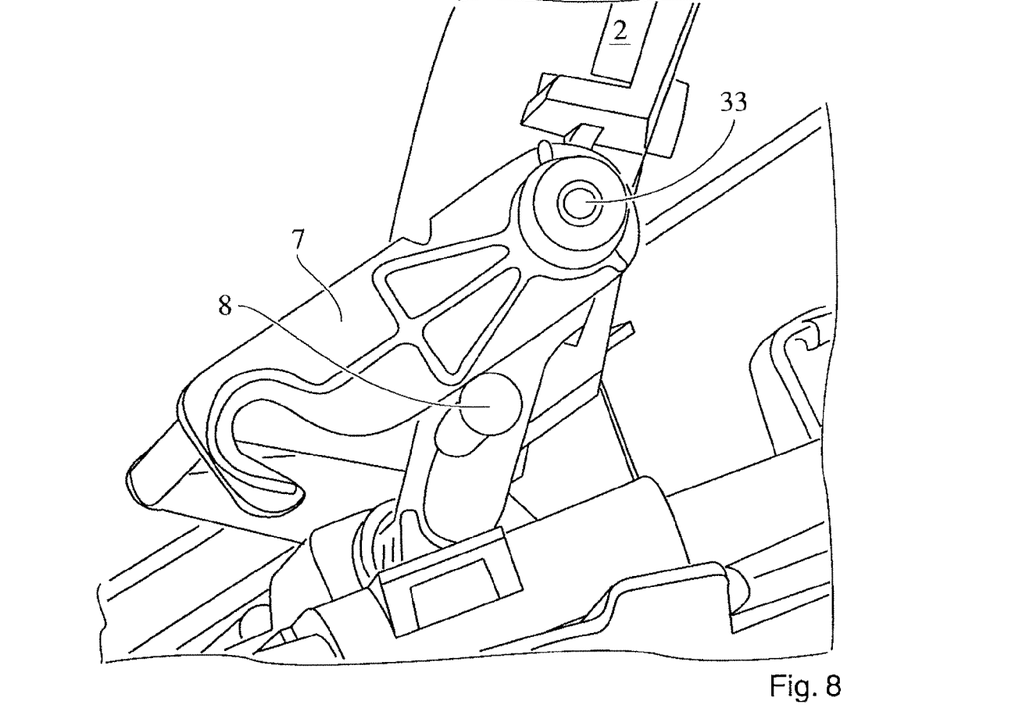
Figure 9:
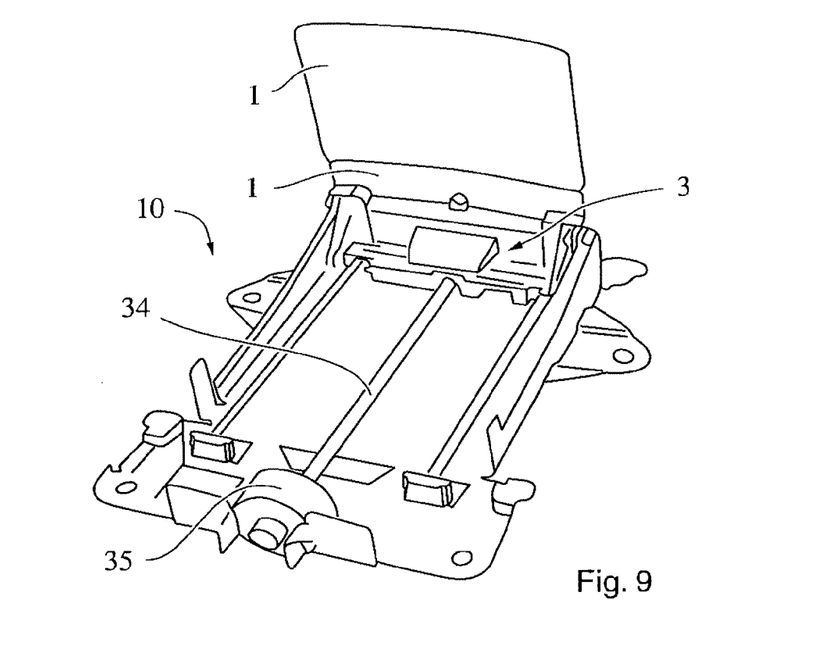

FIGS. 6 and 9 show a view of the whole of the mounting element 10. The mounting element 10 comprises the positioning element 3, the elastic element 4, a bracket 1' to be attached to the extending element 1, a threaded rod 34, and a drive element 35 such as an electric motor.

Figure 10:
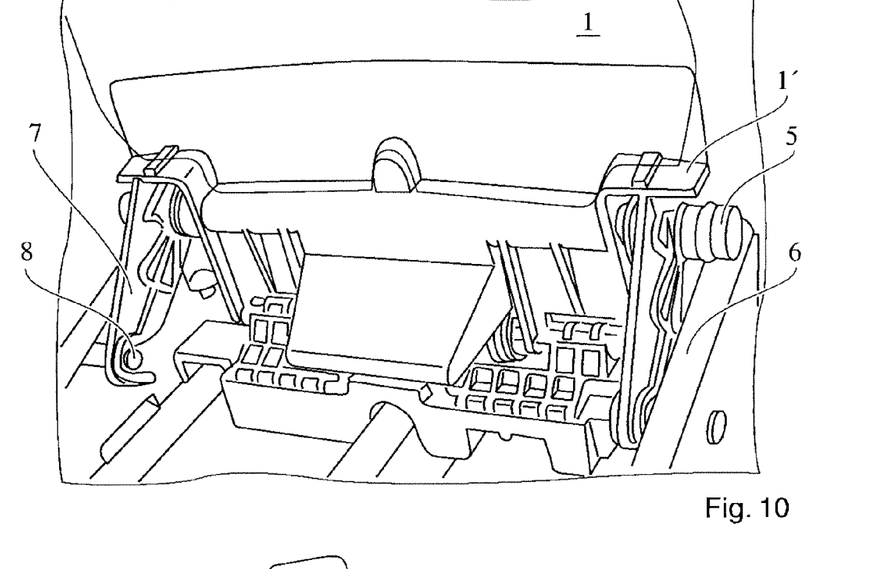
Figure 11:
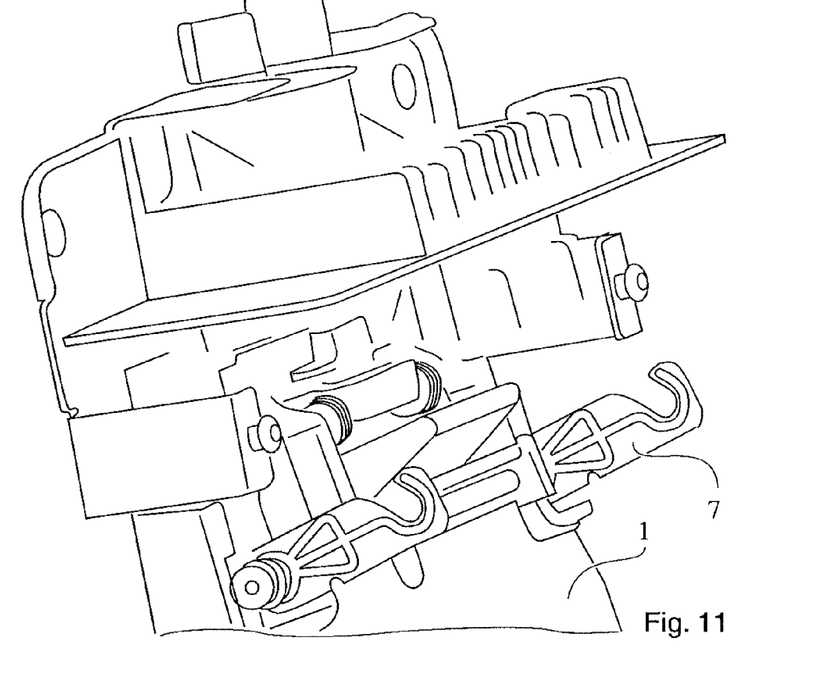
Figure 12:
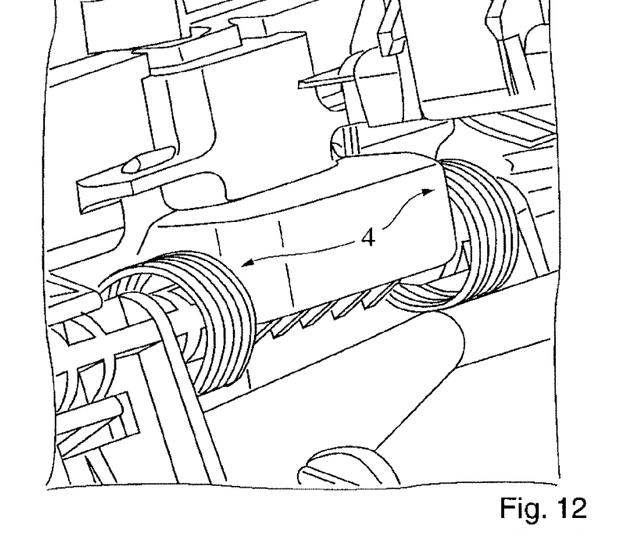
Figure 13:
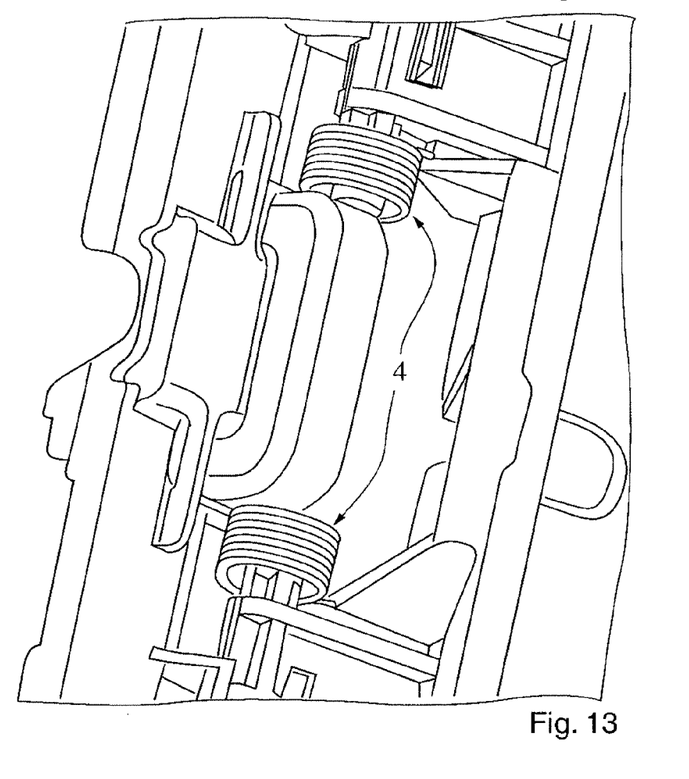

FIGS. 7, 8 and 10 to 15 are detailed views of the mounting element 10. These illustrations show that in the second embodiment of the display device, the mounting element 10 comprises (in addition to the first and second guide elements) a third guide element 8, which may be in the form of a locking pin (see FIG. 8). The mounting element 10 also comprises a fourth guide element 7, which may be in the form of a hook (see FIGS. 7 and 8). The movement of the extending element 1 is defined by the first guide element 6 and the second guide element 5 in a first region of movement of the extending element 1 (or else a first region of movement of the positioning element 3) so that the movement of the extending element 1 includes at least partially a translational part and a rotational part. Further, the movement of the extending element 1 is defined by the third guide element 8 and fourth guide element 7 in a second region of movement of the extending element 1 (or else in a first region of movement of the positioning element 3) so that the movement of the extending element 1 includes at least partially a translational part and a rotational part. The third guide element 8 interacts with the fourth guide element 7 in such a way as to define an angle of inclination of the extending element 1 for each linear position of the positioning element 3. For this purpose a third hinged joint 33 (shown in FIGS. 7 and 8) is provided between the fourth guide element 7 and the extending element 1. FIG. 10 shows the second position of the extending element 1. The guide elements 5, 6, 7 and 8 can be seen. The third and fourth guide elements 7, 8 act together to raise the second guide element (the roller) 5 from the first guide element (the ramp) 6. In FIG. 11 the fourth guide element 7 and the extending element 1 can be seen. FIGS. 12 and 13 show in detail the elastic element 4 illustrated as a metal spring. FIGS. 14 and 15 concentrate on the fourth guide element 7 in the first (rest) position of the extending element 1.

FIGS. 16 to 18 are side views of the display device in the second embodiment of the present invention. FIGS. 16 to 18 show how the guide elements 5, 6, 7 and 8 define the movement of the extending element 1 on the basis of the movement of the positioning element 3. FIG. 16 shows the first position of the extending element 1, and FIG. 18 the second position. FIG. 17 shows an intermediate position between the first and second positions of the extending element 1 when the fourth guide element 7 begins to interact with the third guide element 8.

LIST OF REFERENCE SIGNS

1 extending element
1' bracket for extending element
2 bearing element
3 positioning element
4 elastic element
5 second guide element/roller
6 first guide element/ramp
7 fourth guide element/hook
8 third guide element/locking pin 10 mounting element
31 first hinged joint
32 second hinged joint
33 third hinged joint
34 threaded rod
35 drive element

The invention claimed is:

1. A display device, as for a motor vehicle, comprising an extending element and a mounting element to allow the extending element to be fixed in at least one first, inactive, position and at least one second, extended, position, the display device being designed in such a way that the extending element follows a movement of the extending element between its first and second positions, the movement of the extending element comprising at least partially a translational part and a rotational part, wherein the mounting element comprises an elastic element and a positioning element, the elastic element exerting a force between the extending element on one side and the positioning element on the other side.

2. The display device as claimed in claim 1, wherein the positioning element follows an essentially translational movement between the first and second positions of the extending element, notably a translational movement along a threaded rod.

3. The display device as claimed in claim 1, wherein the positioning element has a first hinged joint to the extending element.

4. The display device as claimed in claim 3, wherein a second guide element has a second hinged joint to the extending element, wherein a first hinged joint is provided between the positioning element and the extending element, wherein the second hinged joint is provided between the second guide element and the extending element, and wherein the first guide element interacts with the second guide element in such a way as to define an angle of inclination of the extending element for each linear position of the positioning element.

5. The display device as claimed in claim 1, wherein the mounting element comprises a first guide element and in that the mounting element comprises a second guide element.

6. The display device as claimed in claim 5, wherein the first guide element comprises a ramp and the second guide element comprises a roller.

7. The display device as claimed in claim 1, wherein the mounting element comprises a third guide element and in that the mounting element comprises a fourth guide element.

8. The display device as claimed in claim 7, wherein the third guide element comprises a locking pin and the fourth guide element comprises a hook.

9. The display device as claimed in claim 1, wherein a second guide element has a second hinged joint to the extending element and/or a fourth guide element has a third hinged joint to the extending element.

10. The display device as claimed in claim 1, wherein the movement of the extending element has a smaller rotational part and a larger translational part near the first position of the extending element and in that the movement of the extending element has a larger rotational part and a smaller translational part near the second position of the extending element.

11. The display device as claimed in claim 1, wherein the extending element is an extending mirror.

12. The display device as claimed in claim 1, further comprising a drive element which turns a threaded rod in order to position the extending element.

13. The display device as claimed in claim 12, wherein the drive element comprises an electric motor.

14. A fixing device, as for a motor vehicle, comprising an extending element and a mounting element to allow the extending element to be fixed in at least one first, inactive, position and at least one second, extended, position, the fixing device being designed in such a way that the extending element follows a movement of the extending element between its first and second positions, the movement of the extending element comprising at least partially a translational part and a rotational part, wherein the mounting element comprises an elastic element and a positioning element, the elastic element exerting a force between the extending element on one side and the positioning element on the other side.

15. The display device as claimed in claim 14, wherein the positioning element has a first hinged joint to the extending element, wherein a second guide element has a second hinged joint to the extending element, wherein a first hinged joint is provided between the positioning element and the extending element, wherein the second hinged joint is provided between the second guide element and the extending element, and wherein the first guide element interacts with the second guide element in such a way as to define an angle of inclination of the extending element for each linear position of the positioning element.

* * * * *